United States Patent
Koide et al.

(10) Patent No.: US 7,192,204 B2
(45) Date of Patent: Mar. 20, 2007

(54) CAMERA

(75) Inventors: Atsushi Koide, Tokyo (JP); Masaki Hanzawa, Chiba (JP); Michio Yokoyama, Gifu (JP)

(73) Assignee: Sony Corporation (JP)

( * ) Notice: Subject to any disclaimer, the term of this patent is extended or adjusted under 35 U.S.C. 154(b) by 213 days.

(21) Appl. No.: 11/004,987

(22) Filed: Dec. 7, 2004

(65) Prior Publication Data
US 2006/0204241 A1    Sep. 14, 2006

(30) Foreign Application Priority Data
Dec. 26, 2003   (JP)   ............ P2003-432261

(51) Int. Cl.
*G03B 17/26* (2006.01)
(52) U.S. Cl. .............. 396/423; 294/139; 348/376
(58) Field of Classification Search ........... 396/423; 294/139
See application file for complete search history.

(56) References Cited

U.S. PATENT DOCUMENTS

| | | | |
|---|---|---|---|
| 4,772,902 A * | 9/1988 | Inoue et al. | 396/423 |
| 4,819,016 A * | 4/1989 | Leonard et al. | 396/423 |
| 5,341,171 A * | 8/1994 | Mori et al. | 348/373 |
| 5,657,084 A * | 8/1997 | Kurokawa et al. | 348/373 |
| 5,729,291 A * | 3/1998 | Tanaka et al. | 348/373 |
| 6,942,400 B2 * | 9/2005 | Shibayama | 396/419 |
| 2004/0126099 A1 * | 7/2004 | Mori et al. | 386/117 |

FOREIGN PATENT DOCUMENTS

JP    2001-053987    2/2001

* cited by examiner

*Primary Examiner*—W. B. Perkey
(74) *Attorney, Agent, or Firm*—Rader Fishman & Grauer; Ronald P. Kananen (57) ABSTRACT

A camera is provided where it is easy for a user to grip a camera body, it is easy for the user to operate, and it is advantageous for improving handling and manageability. A grip belt is provided at the right side surface of a camera body. The grip belt has a first belt and a second belt. The second belt is connected to a belt connecting link. The second belt has a hand insertion section of a size that allows insertion of four fingers of the right hand with the exception of the thumb and the palm portion corresponding to the four fingers, which is provided by an inside belt section positioned at the right side surface of the camera body and an outside belt section positioned to the outside of the inside belt section.

6 Claims, 14 Drawing Sheets

CAMERA

CROSS REFERENCE TO RELATED APPLICATIONS

The present document is based on Japanese Priority Document JP2003-432261, filed in the Japanese Patent Office on Dec. 26, 2003, the entire contents of which are incorporated herein by reference.

BACKGROUND OF THE INVENTION

1. Field of the Invention

The present invention relates to a camera equipped with a grip belt.

2. Description of the Related Art

Cameras such as, for example, video cameras are well known. Such a video camera is provided with a camera body formed in a flat rectangular shape of a length from front to back and height from top to bottom greater than the thickness from left to right, a photographing optical system provided so as to be exposed from the upper part of a front surface of the camera body, photographing operation members provided at the upper front part of the right side surface of the camera body, and a grip belt provided at the right side surface of the camera body. The ends of this kind of grip belt are connected to locations at the front part and rear part of the side surface of the camera body. The palm of the right hand is then made to face the side surface of the camera body. The four fingers with the exception of the thumb are then inserted into a space formed between the grip belt and the side surface of the camera body with the back of the right hand facing the inside of the grip belt so that, for example, the thumb is positioned at the lower part or the rear part of the camera body. The fingers with the exception of the thumb are then positioned at the upper part or front part of the camera body. This means that photographing operation members can then be operated while the camera body is gripped using the thumb and the other fingers (for example, refer to patent document 1).

[Patent Document 1]

Japanese Patent Application Publication No. 2001-53987

SUMMARY OF THE INVENTION

With cameras of the related art, however, the fingertips are not always positioned at appropriate locations for gripping the camera when the hand is inserted between the camera body side surface and the grip belt. This is disadvantageous with regard to gripping the camera body securely. And, the fingers are not always positioned at locations where it is easy to operate the photographing operation members, so this is also disadvantageous with regard to operation. Further, because the hand is inserted between the camera body side surface and the grip belt, the inserted hand becomes restrained by the camera body side surface and the grip belt. More specifically, the palm of the hand is always restrained at the side surface of the camera body and there is no longer any degree of freedom for the palm of the hand, which puts a limit on improvements to handling and manageability. The present invention sets out to resolve this situation. The present invention provides a camera where it is easy for a user to grip a camera body, it is easy for the user to operate, and it is advantageous for improving handling and manageability.

In order to bring about the aforementioned advantages, a camera according to the present invention includes: a camera body formed in a flat rectangular shape of a length from front to back and a height from top to bottom greater than a thickness from left to right; a photographing optical system provided so as to be exposed from the upper part of a front surface of the camera body; a photographing operation member provided at the upper front part of the right side surface of the camera body; and a grip belt provided at the right side surface of the camera body. The grip belt has a first belt attached to the lower part of the front part of the camera body so as to be hung down from the lower part with a belt connecting link being attached to the lower end of the belt, and a second belt connected to the belt connecting link. The second belt has a hand insertion section of a size that allows insertion of four fingers of the right hand with the exception of the thumb and the palm portion of the hand corresponding to the four fingers. The hand insertion section is provided by an inside belt section positioned at the right side surface of the camera body and an outside belt section positioned to the outside of the inside belt section. One end of the inside belt section in the longitudinal direction is connected to the belt connecting link and the other end in the longitudinal direction is attached to the rear part of the right side surface of the camera body. The hand insertion section therefore takes on a long shape in a direction from the front to the rear of the camera body on the right side surface of the camera body due to the inside belt section, and it is tilted so that the rear end of the hand insertion section is positioned above the front end of the hand insertion section. The four fingers of the right hand with the exception of the thumb and the palm part of the hand corresponding to the four fingers are then inserted through the hand insertion section so that the tip of the thumb comes into contact with the rear surface of the camera, and the camera is held with at least the tips of the middle finger and third finger coming into contact with the front surface of the camera body. It is then possible to operate photographing operation members using the index finger.

As a result, according to the present invention, the hand is inserted into a hand insertion section where a substantial range of freedom of movement with respect to the right side surface of the camera body, is ensured by the first belt. This differs from the related art in that a substantial degree of freedom for the palm of the hand can be ensured. It is also easy for the fingertips to reach appropriate locations for gripping the camera body which enables the camera body to be securely held. The fingers also can easily reach locations where it is easy to operate the photographing operation members, which is advantageous in operating photographing operation members provided at the upper part of the front part of the right side surface of the camera body. This means that there is no restriction of the hand due to the camera body side surface as in the related art, a substantial degree of freedom can be ensured for the palm of the hand, and it is advantageous for improving handling and manageability.

DESCRIPTION OF THE PREFERRED EMBODIMENTS

The advantages of making the camera body easy to grip, making operation straightforward, and improving handling and manageability is achieved by providing a hand insertion section of a size capable of enabling four fingers and the palm corresponding to the four fingers to be inserted through at a grip belt.

First Embodiment

The following is a description with reference to the drawings of a first embodiment of the present invention. In this specification, left and right of the camera is taken to be the left and right of the camera as viewed from the rear.

Figure 1:
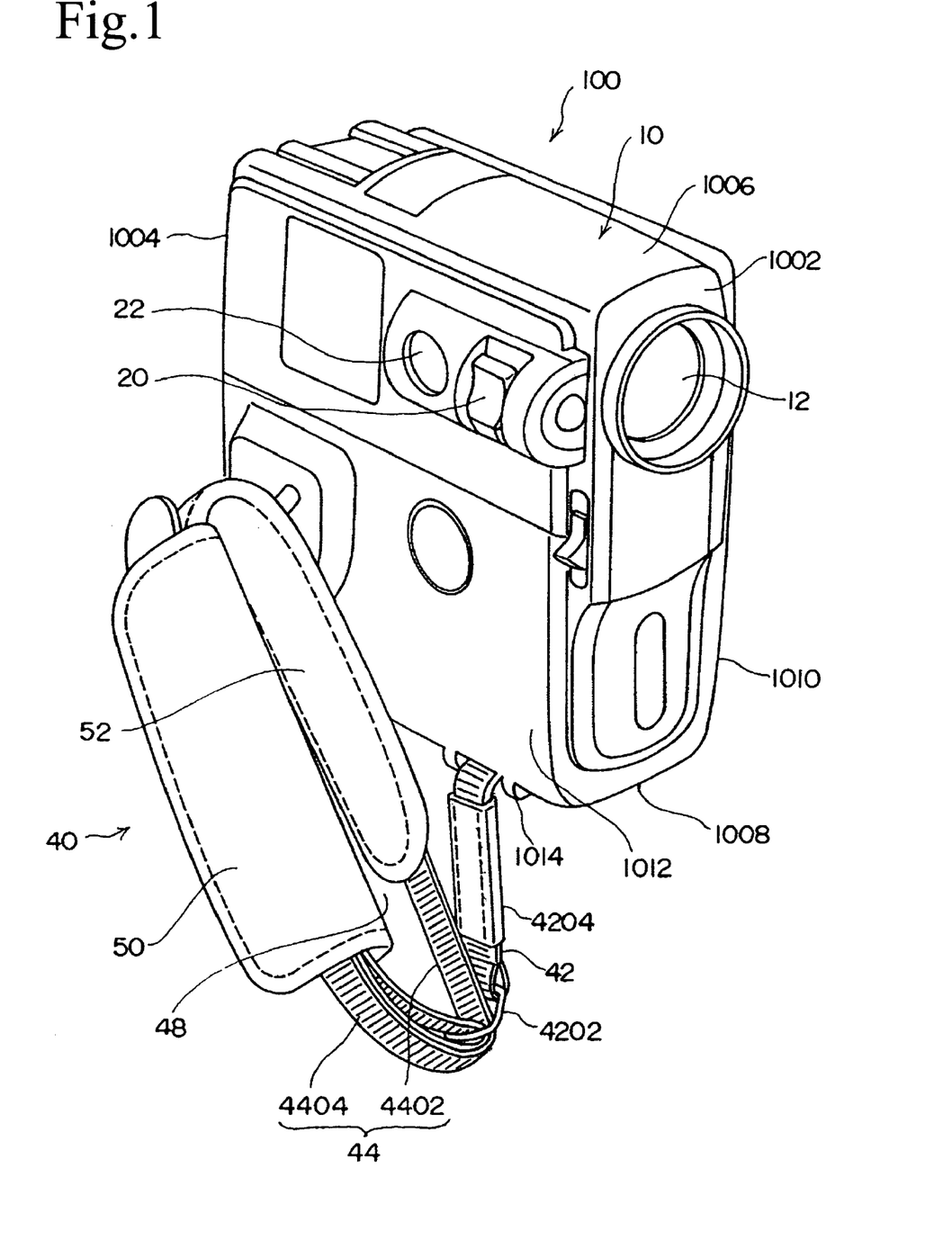
FIG. 1 is a perspective view from the front of a camera of a first embodiment.
Figure 2:
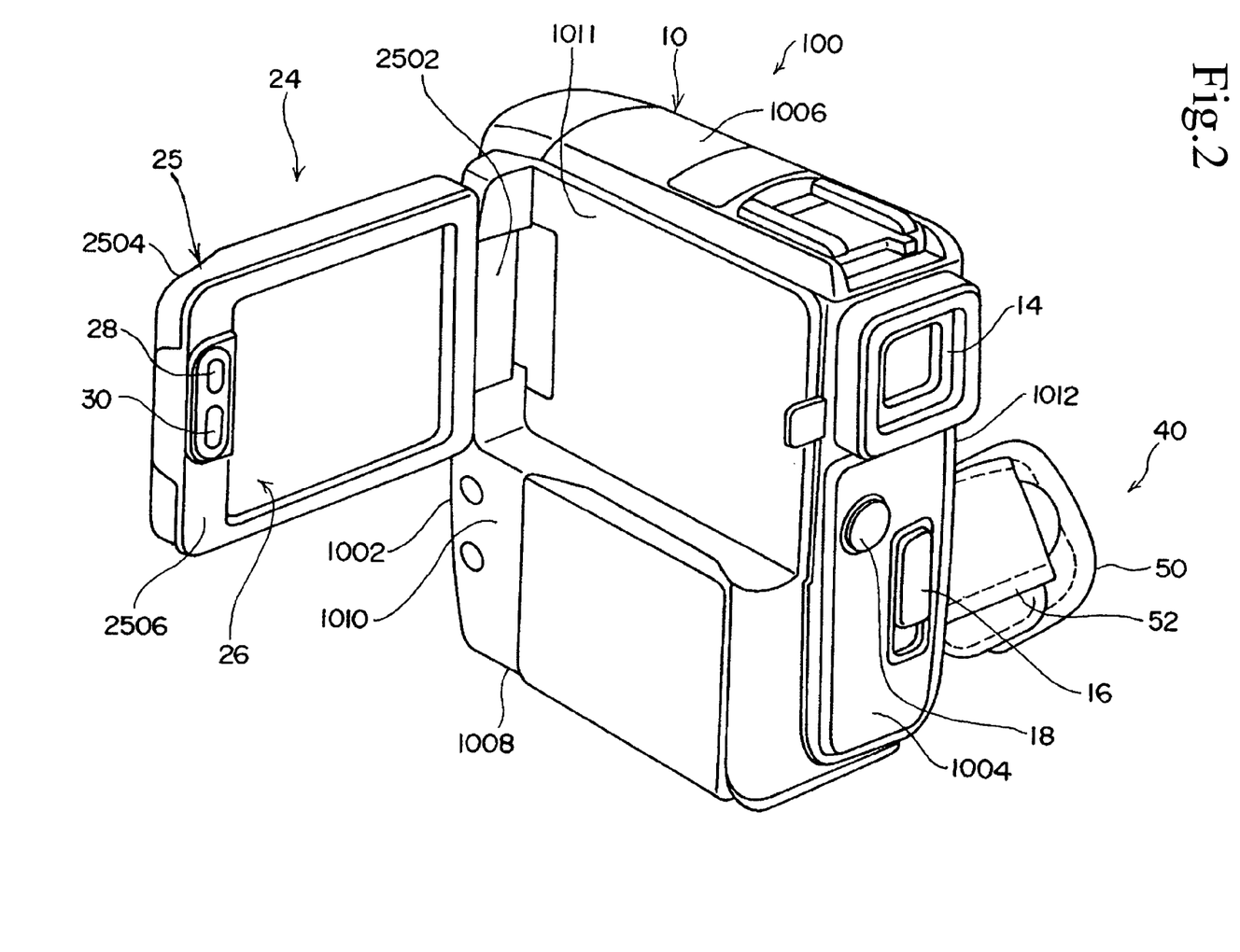
FIG. 2 is a perspective view from the rear of the camera of the first embodiment.
Figure 3:
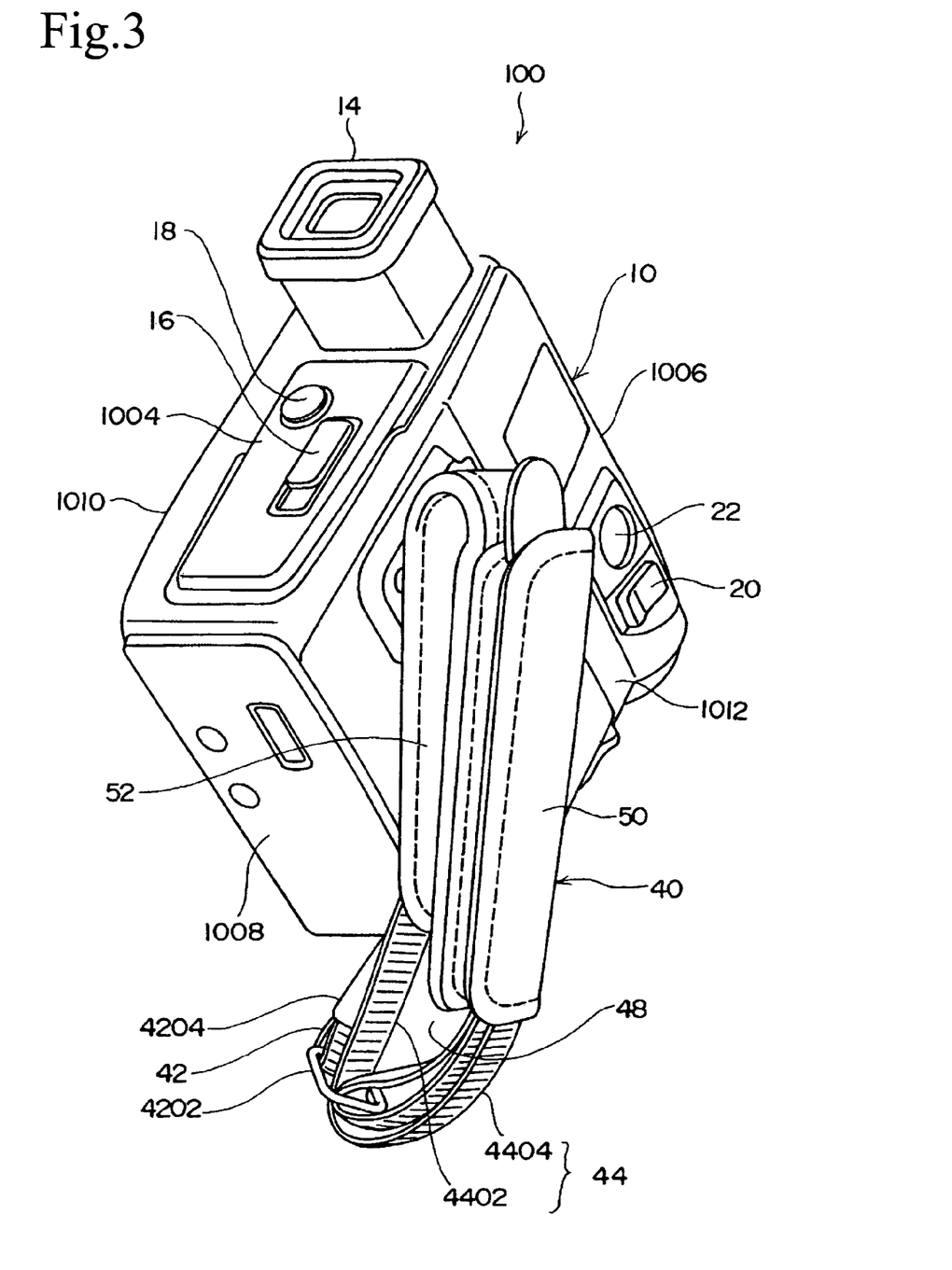
FIG. 3 is a perspective view of a camera of the first embodiment from below.

As shown in FIG. 1 to FIG. 3, the camera of this embodiment is a video camera 100 capable of recording moving images and still images. The video camera 100 is equipped with a camera body 10. A camera mechanism and a video mechanism are built-in in an integrated manner within the camera body 10. The camera body 10 is formed in a flat rectangular shape of a length from front to back and a height from top to bottom greater than a thickness from left to right. In this embodiment, the camera body 10 is formed of dimensions where the height from top to bottom is greater than the length from front to rear so that the video camera 100 is a vertical type.

As shown in FIG. 1, the camera body 10 is provided with a photographing optical system 12 positioned so as to be exposed from the upper part of a front surface 1002 of the camera body 10. As shown in FIG. 2 and FIG. 3, a viewfinder 14 is provided at the upper part of a rear surface 1004 of the camera body 10. A power switch 16 and a start/stop button 18 for starting and stopping moving image recording are provided at locations on the rear surface 1004 below the viewfinder 14. A zoom lever 20 is arranged in a swingable manner at an upper part of the front part of the right side surface 1012 of the camera body 10 as shown in FIG. 3, and a shutter button 22 for taking still images is provided at a location to the rear of the zoom lever 20. In this embodiment, the power switch 16, the start/stop button 18, the zoom lever 20 and the shutter button 22 constitute the photographing operation member of the present invention.

As shown in FIG. 2, a display unit 24 rectangular in shape is provided in a manner capable of opening and closing at an upper half of the left side surface 1010 of the camera body 10, and a recess 1011 for housing the display unit 24 when closed also is provided. The display unit 24 is equipped with a case 25 and a display 26. The case 25 is rectangular in shape and is an oblong rectangle with the dimension from front to back being greater than the dimension from top to bottom and the front part is connected so as to be openable and closable at a hinge 2502 provided at an upper part of the front part of the left side surface 1010 of the camera body 10. The connection of the case 25 using the hinge 2502 is such as to enable rotation about a first axis extending in a vertical direction of the camera body 10 and rotation about a second axis of rotation orthogonal to the first axis. The case 25 is provided with an outer surface 2504 positioned on one side in the thickness direction, an inner surface 2506 positioned at the other side in the thickness direction, and a recess provided at the inner surface 2506. The outer surface 2504 of the case 25 is constructed so as to form part of the surface of the camera body 10 continuing on from the surface of the camera body 10 with the display 25 closed. The display 26 is housed in the recess. Thus, the inner surface of the case constitutes a rectangular frame surface extending about the periphery of the display. The display 26 is for displaying images including moving images, still images and characters, etc. The display is comprised of, for example, a hybrid liquid crystal display and a backlight for illuminating the hybrid liquid crystal display. In this embodiment, both displaying where the hybrid liquid crystal display is illuminated by the backlight and displaying where the backlight is extinguished and does not illuminate the hybrid liquid crystal display but rather the hybrid liquid crystal display is illuminated using light from the peripheral surroundings are possible.

Figure 13:
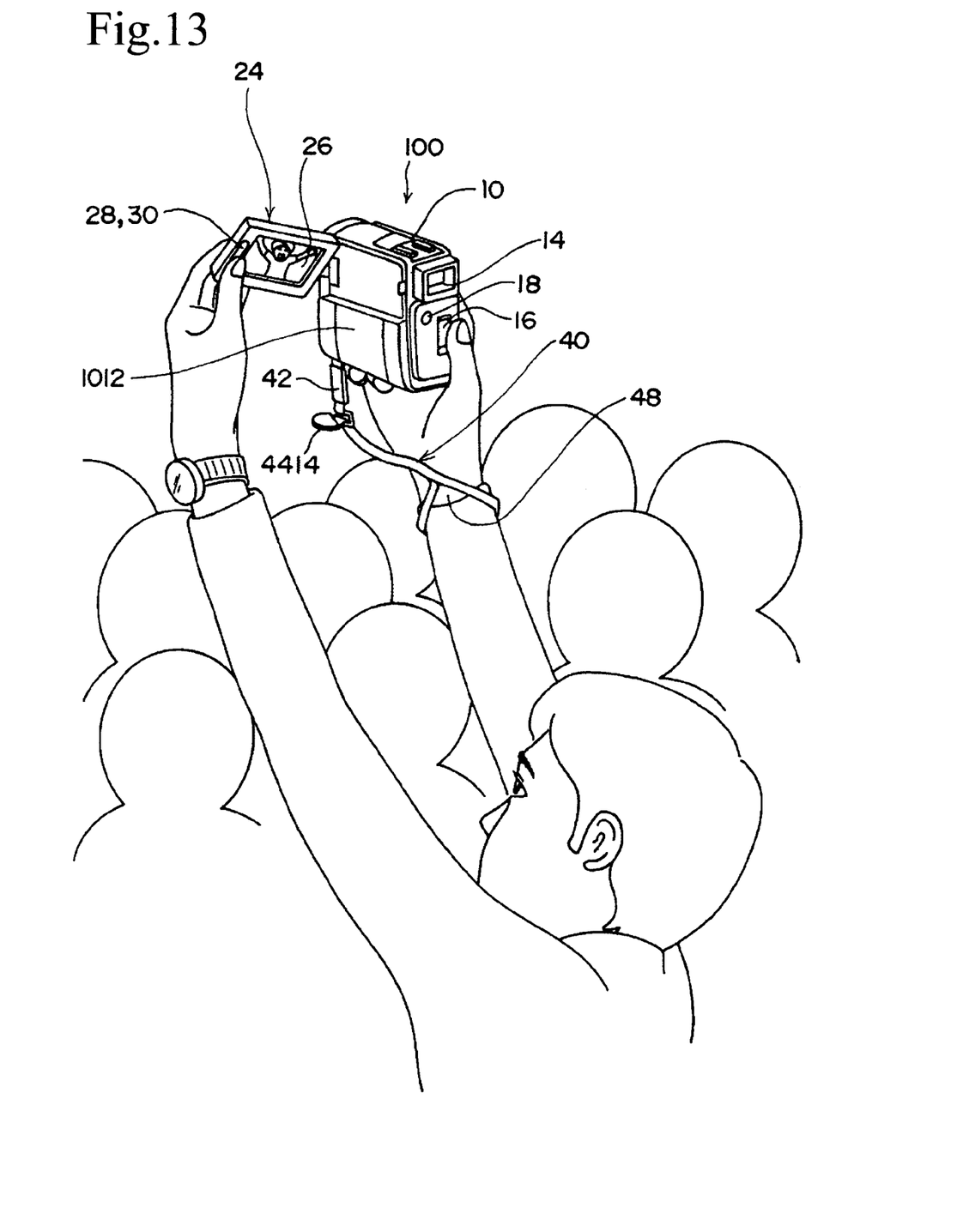
FIG. 13 is a further view illustrating use of a grip belt.
Figure 14:
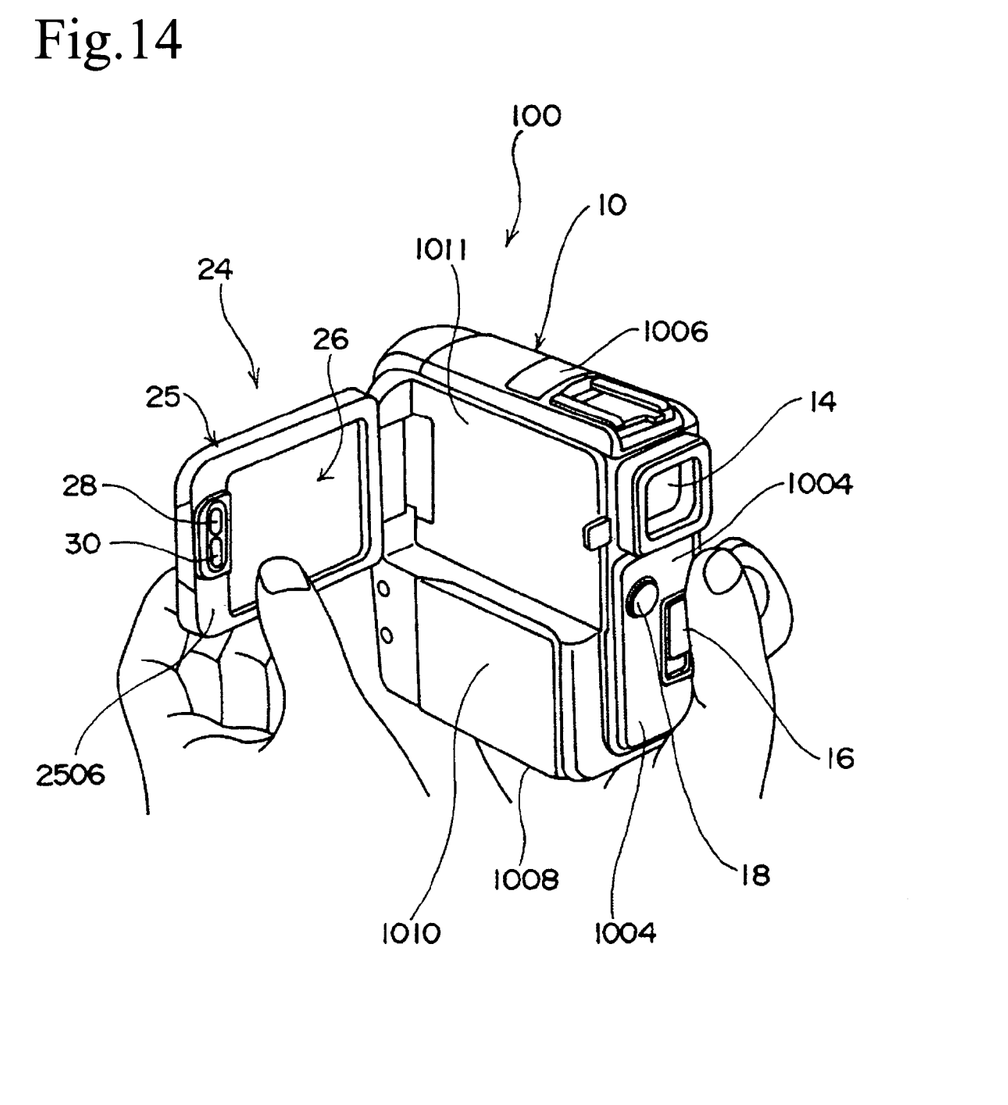
FIG. 14 is a view illustrating the operation of a camera.

A backlight button 28 is provided on an upper side and a start/stop button 30 is provided on a lower side at a location positioned on the opposite side to the hinge 2502 of the inner surface 2506, and, more specifically, at a location positioned on the opposite side to the hinge 2502 in a direction from the front to the rear of the case. The backlight button 28 is for turning the backlight of the display 26 on and off, and the start/stop button 30 starts and stops recording of moving images in the same way as the start/stop button 18. The backlight button 28 and the start/stop button 30 are provided located at a position on the opposite side to the hinge 2502 of the inner surface 2506 of the display unit 24. If the screen surface of the display unit 24 is then facing the user side when taking high-angle or low-angle pictures as shown in FIG. 13 and FIG. 14, the backlight button 28 and the start/stop button 30 are inevitably positioned in a location where operation by the fingertips of the left hand of the user is straightforward, and it is therefore advantageous for improving the ease of operation. There is also the advantage that the edge of the case 25 of the display unit 24 is gripped in the thickness direction using the thumb and fingers of the left hand at a position in the vicinity of the backlight button 28 and the start/stop button 30, so that it is possible to prevent camera shake and achieve a stable photographing posture. The switches provided at the case 25 of the display unit 24 are by no means limited to the backlight 28 and the start/stop button 30, and may also be, for example, a zoom operation switch or a shutter switch, etc. Further, some or all of these switches also may be implemented as touch switches provided on the screen surface of the display 26.

A grip belt 40 is provided at the right side surface 1012 of the camera body 10, as shown in FIG. 1 and FIG. 3. In this embodiment, the grip belt 40 has a first belt 42 and a second belt 44. The first belt 42 and the second belt 44 are made, for example, of flexible synthetic resin material. One end in the longitudinal direction of the first belt 42 is attached to a mounting section 1014 at a lower part of the front part of the right side surface 1012 of the camera body 10, and the other end of the belt 42 is attached to a rectangular hoop-shaped belt connecting link 4202, with a pad 4204 being attached to the first belt 42 with the exception of both ends in the longitudinal direction. When the camera body 10 is lifted, the first belt 42 hangs down from the mounting section 1014 in such a manner that the widthwise direction of the first belt is parallel to the direction from front to rear of the camera. The pad 4204 is formed, for example, from a flexible material such as artificial leather, thick cloth, flexible synthetic resin, flexible rubber, etc.

Figure 4:
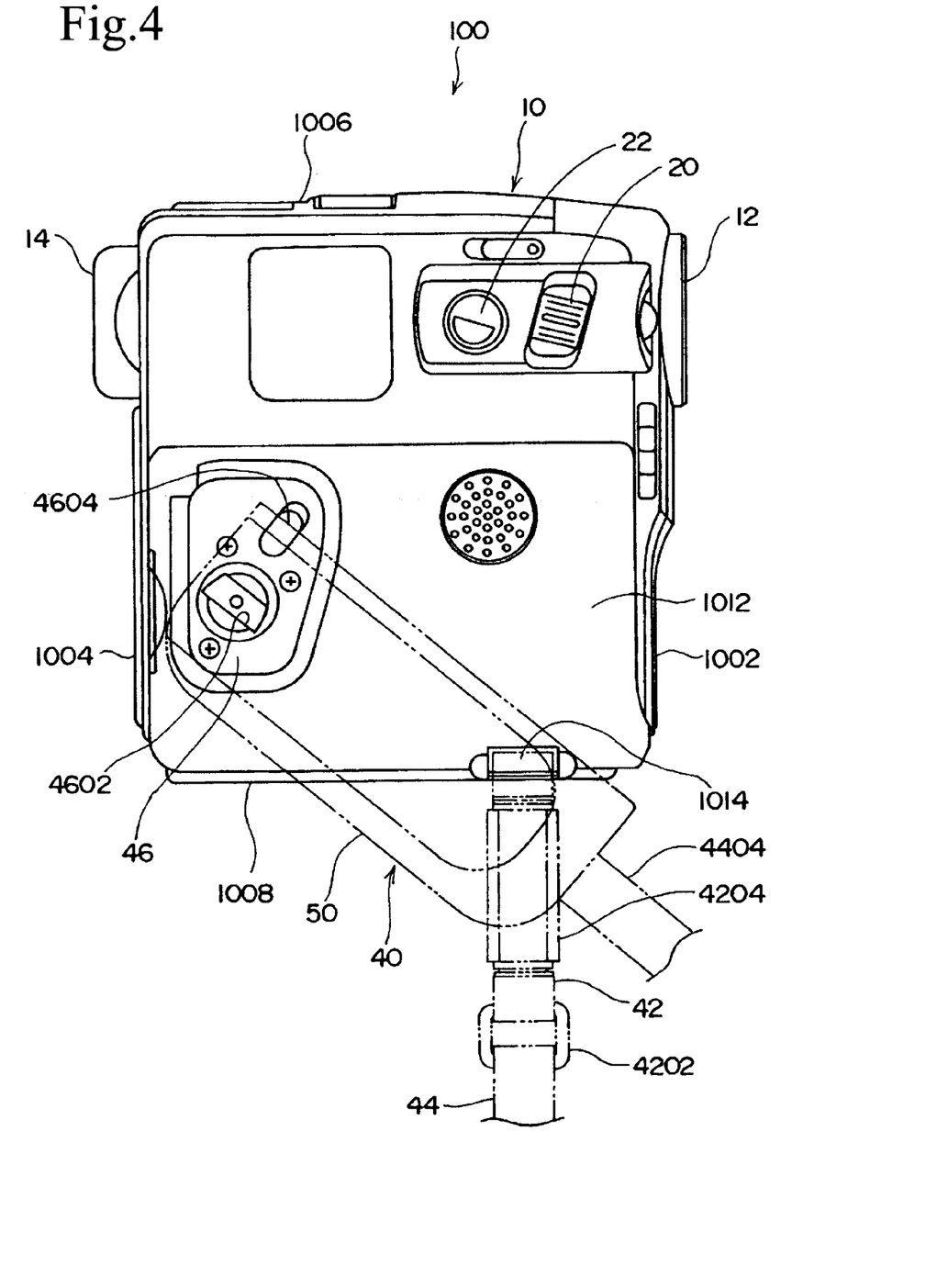
FIG. 4 is a view illustrating a connection of a grip belt to a camera.
Figure 5:
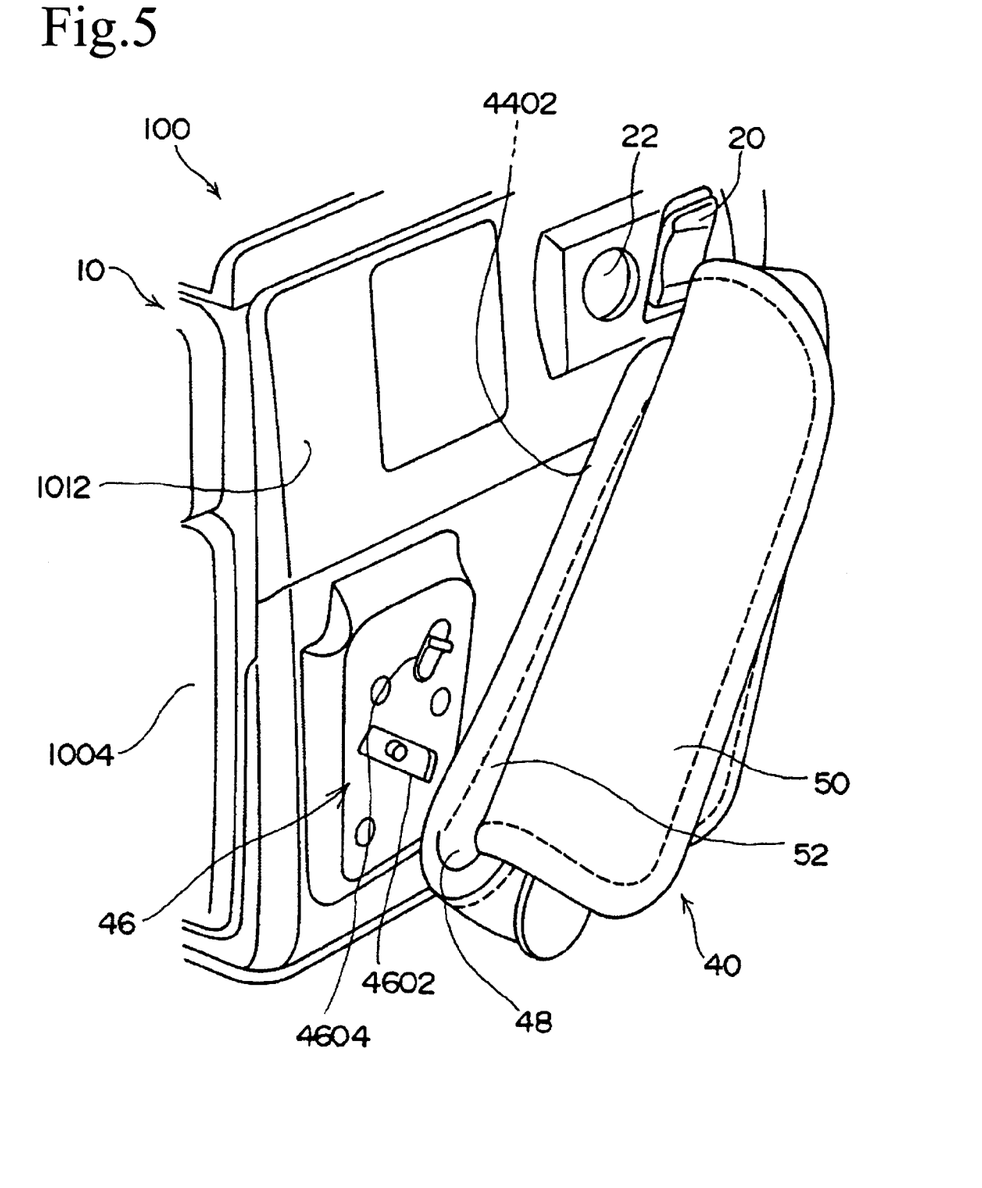
FIG. 5 is another view illustrating attaching and detaching of a grip belt to and from a camera.
Figure 6:
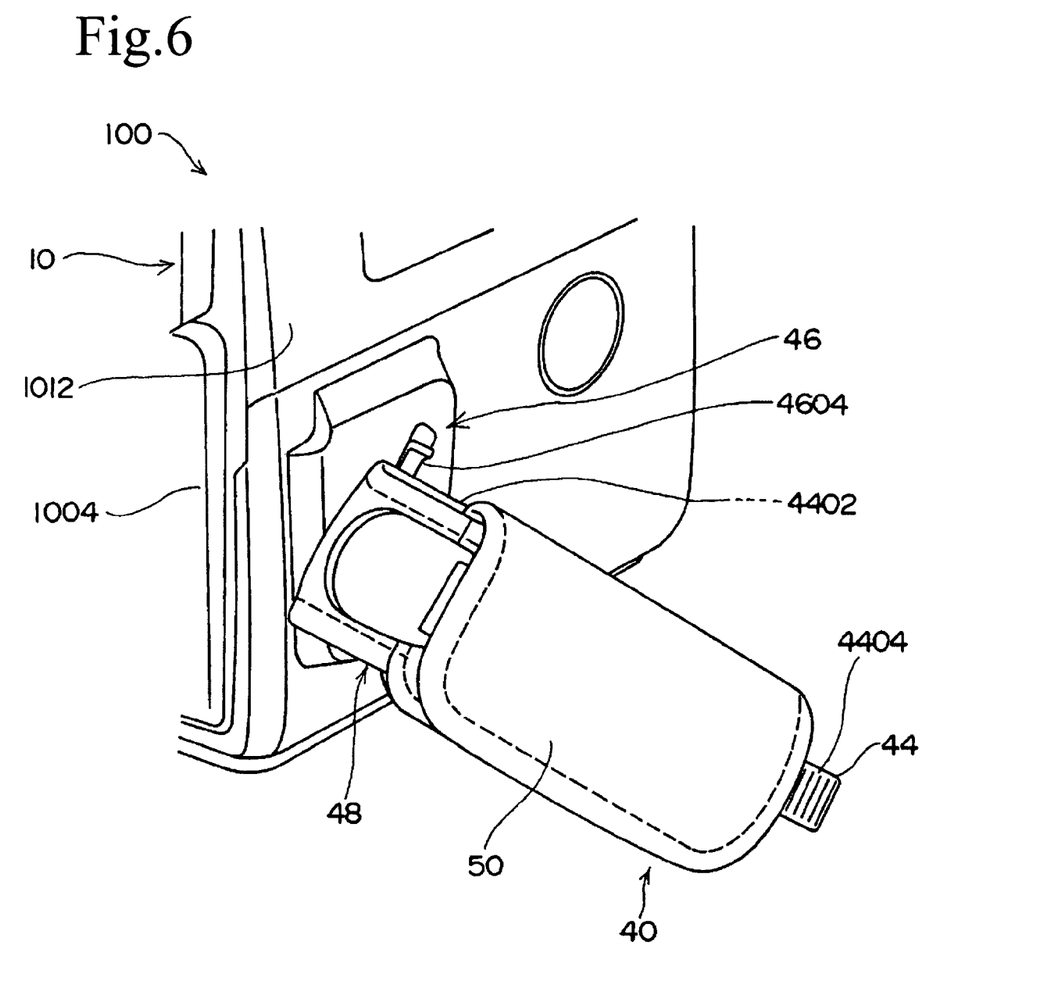
FIG. 6 is a further view illustrating attaching and detaching of a grip belt to and from a camera.
Figure 8:
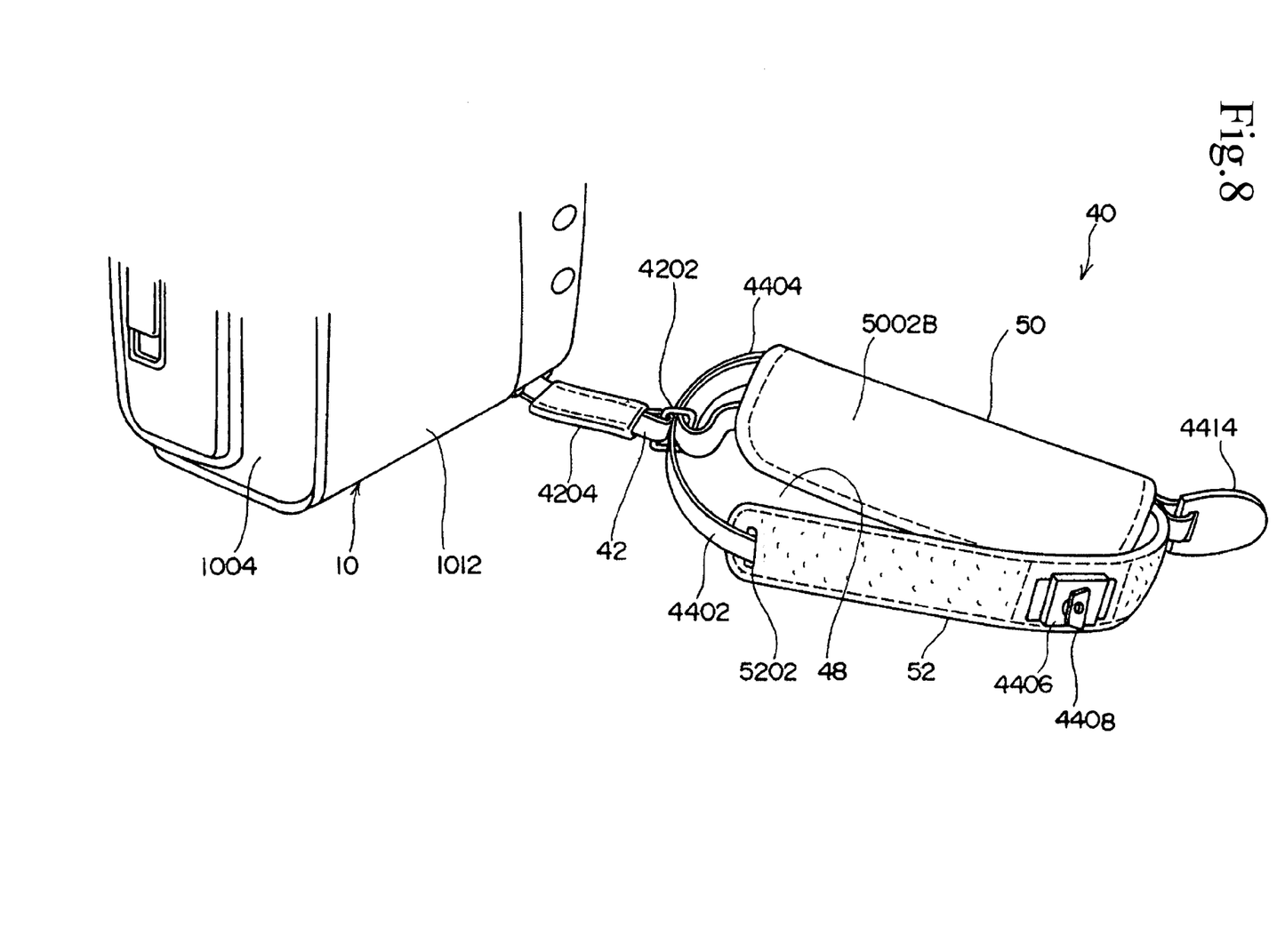
FIG. 8 is another perspective view showing a configuration for a grip belt.

The second belt 44 is provided so as to be joined to the belt connecting link 4202. As shown in FIG. 1 and FIG. 3, at the second belt 44, a hand insertion section 48 of a size that allows four fingers of the right hand with the exception of the thumb and the palm portion corresponding to the four fingers to be inserted within is provided as a result of providing an inside belt section 4402 positioned at the right side surface 1012 of the camera body 10 and an outside belt section 4404 positioned at the outside of the inside belt section 4402. One end in the longitudinal direction of the inside belt section 4402 is connected to the belt connecting link 4202. The other end in the longitudinal direction of the inside belt section 4402 is attached to the rear part of the right side surface 1012 of the camera body 10. In this embodiment, the other end of the inside belt section 4402 is attached at a rear part of the right side surface 1012 of the camera body 10 and at a location above the mounting section 1014 where the first belt 42 is attached to the camera body 10. Further, in this embodiment, the other end of the inside belt section 4402 is attached in a detachable manner to a rear part of the right side surface 1012 of the camera body 10. Describing this in more detail, as shown in FIG. 4, FIG. 5 and FIG. 6, an engaging/disengaging mechanism 46 constituted by an oblong engaging hole 4602 and a release lever 4604 is provided at the rear part of the right side surface 1012 of the camera body 10, and a clasp 4406 engaging and disengaging with the engaging/disengaging mechanism 46 is provided at the inside belt section 4402 as shown in FIG. 8. As shown in FIG. 5, an engaging piece 4408 of the clasp 4406 is inserted into the engaging hole 4602 as the inside belt section is inclined so that the front part of the inside belt section 4402 becomes higher than the rear part. Then, as shown in FIG. 6, after tilting so that the front part of the inside belt section 4402 becomes lower than the rear part, the engaging piece 4408 engages with the engaging/disengaging mechanism 46. Further, the release lever 4604 is operated from the inclined state of the inside belt section 4402 as shown in FIG. 6, and when tilting takes place so that the front part of the inside belt section 4402 becomes higher than the rear part as shown in FIG. 5, the engaging piece 4408 is released from the engaging/disengaging mechanism 46. Various structures that are well known in the related art may be adopted for the structures of the engaging/disengaging mechanism 46 and the clasp 4406.

As a result of connecting both ends in the longitudinal direction of the inside belt section 4402 to the belt connecting link 4202 and the engaging/disengaging mechanism 46 in this manner, the hand insertion section 48 takes on a long shape in a direction from the front to the rear of the camera body 10 at the right side surface 1012 of the camera body 10 and the rear end of the hand insertion section 48 is inclined so as to be positioned higher than the front end of the hand insertion section 48. More specifically, looking from the side of the camera body 10, the front part in the longitudinal direction of the hand insertion section 48 is positioned below the camera body 10, a middle section in the longitudinal direction of the hand insertion section 48 is positioned in the vicinity of the lower surface of the camera body 10, and the rear part of the hand insertion section 48 is positioned to the right side surface 1012 of the camera body 10. Further, the hand insertion section 48 is such that the front end of the hand insertion section 48 is capable of moving in a vertical direction and in a direction away from the right side surface 1012 of the camera body 10 by taking a location at the rear end attached to the engaging/disengaging mechanism 46 as a fulcrum, and therefore a degree of freedom can be ensured. Moreover, the front end of the hand insertion section 48 is connected to the lower end of the first belt 42. The front end of the hand insertion section 48 is therefore capable of moving within a range corresponding to the range of movement of the first belt 42 by taking the mounting section 1014 as a fulcrum, and therefore a larger degree of freedom can therefore be ensured for the hand insertion section 48. A back hand pad 50 is attached at the outside belt section 4404. The back hand pad 50 is made, for example, from a flexible material such as artificial leather, thick cloth, flexible synthetic resin, or flexible rubber, etc. In this embodiment, a pad 52 is attached to the back hand pad 50. The pad 52 makes contact with the palm of the hand when the four fingers of the right hand except for the thumb and the part of the palm corresponding to the four fingers are inserted in the hand insertion section 48 and covers the inside belt section 4402. The pad 52 is made, for example, from a flexible material such as artificial leather, thick cloth, flexible synthetic resin, or flexible rubber, etc. As described above, by attaching the back hand pad 50 to the outside belt section 4404 and providing the pad 52 continuing on from the pad 50 at the inside belt section 4402, it is possible for the user to find out instantly whether the palm of his/her hand has passed through the hand insertion section 48. It is therefore possible to hold the camera 10 by inserting the four fingers with the exception of the thumb and the part of the palm corresponding to these four fingers through the hand insertion section 48 so that the end of the thumb comes into contact with the rear surface of the camera body 10 and at least the tip of the middle finger and the tip of the third finger come into contact with the front surface of the camera body 10. It is then possible to operate the zoom lever 20 and the shutter button 22 using the index finger.

Figure 7:
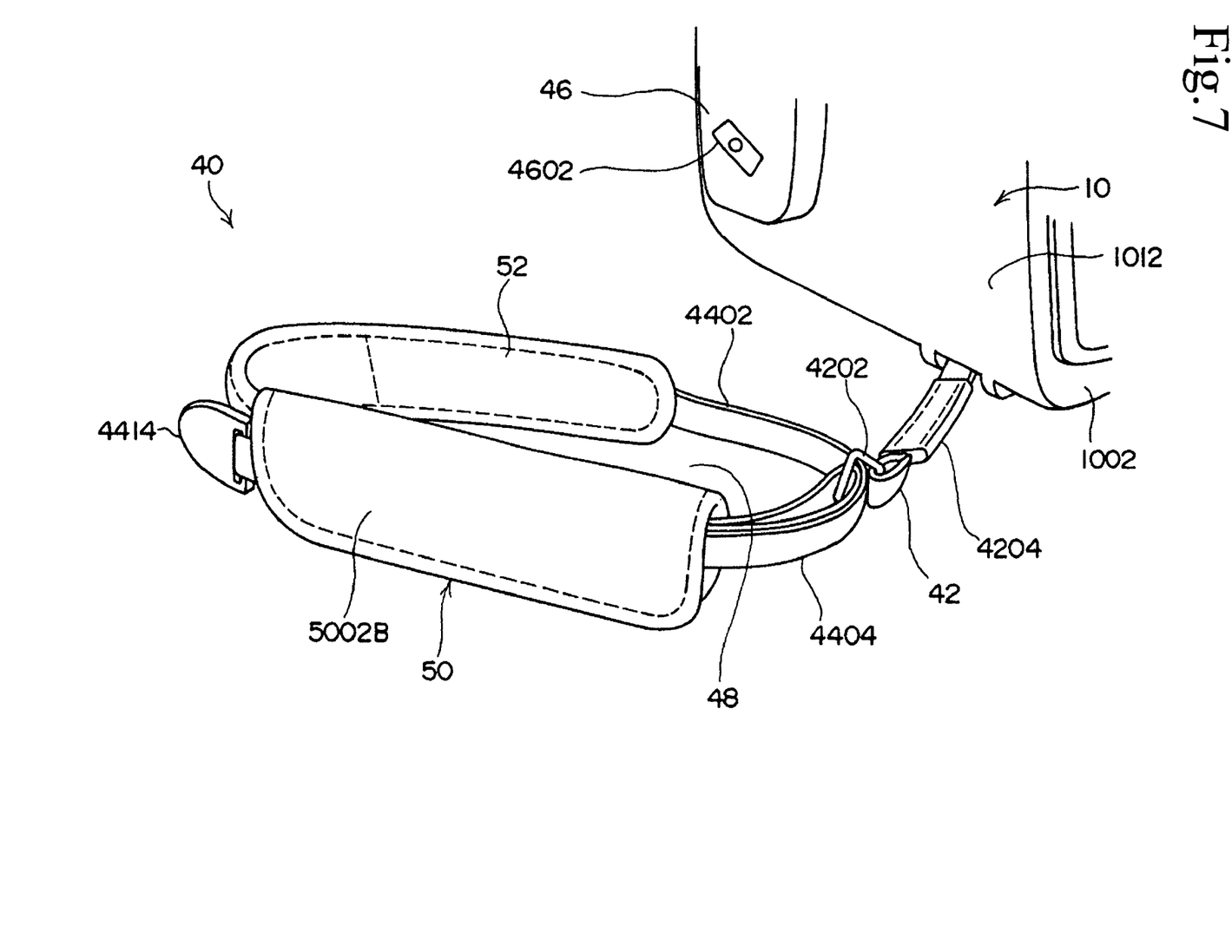
FIG. 7 is a perspective view showing a configuration for a grip belt.
Figure 9:
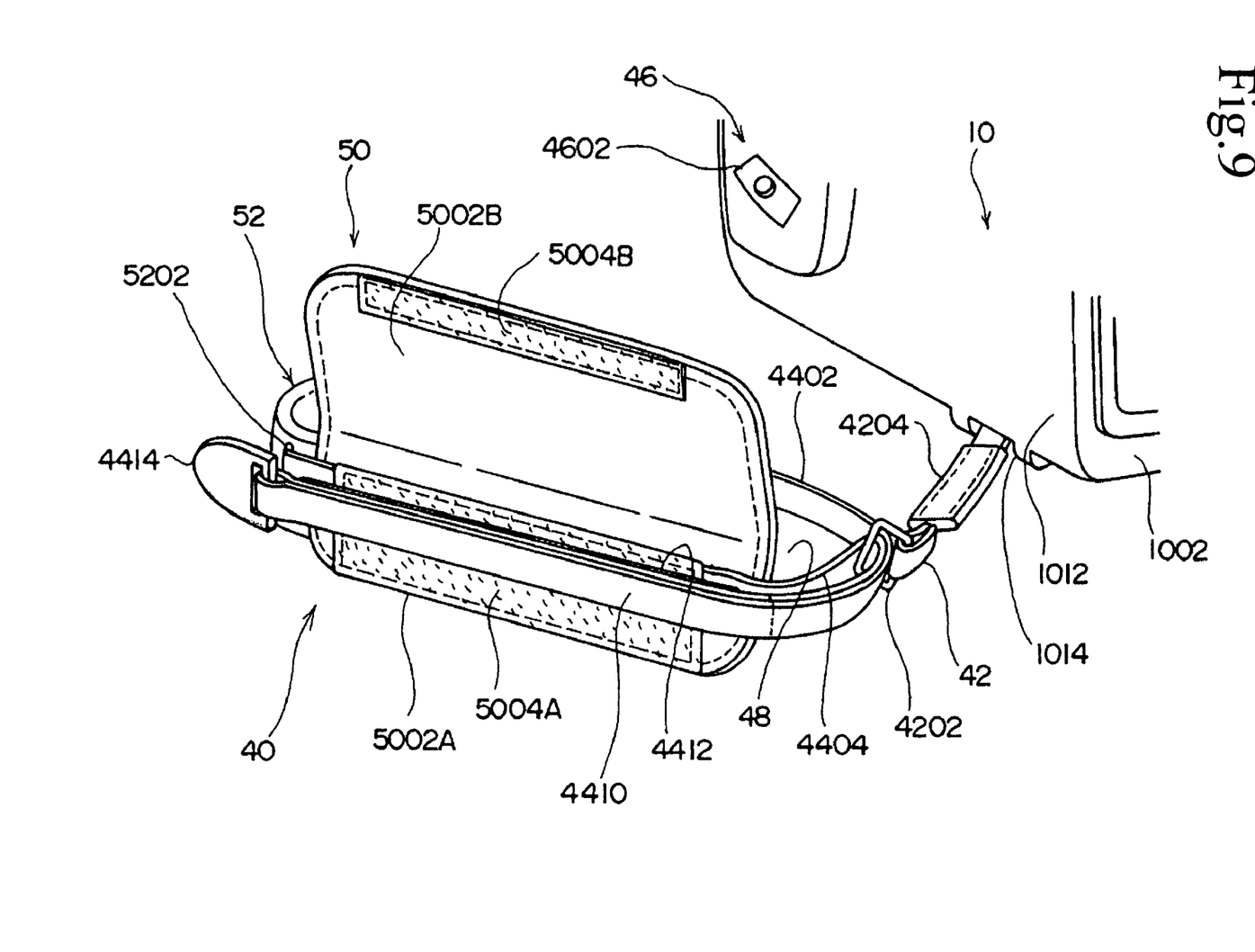
FIG. 9 is a further perspective view showing a configuration for a grip belt.
Figure 10:
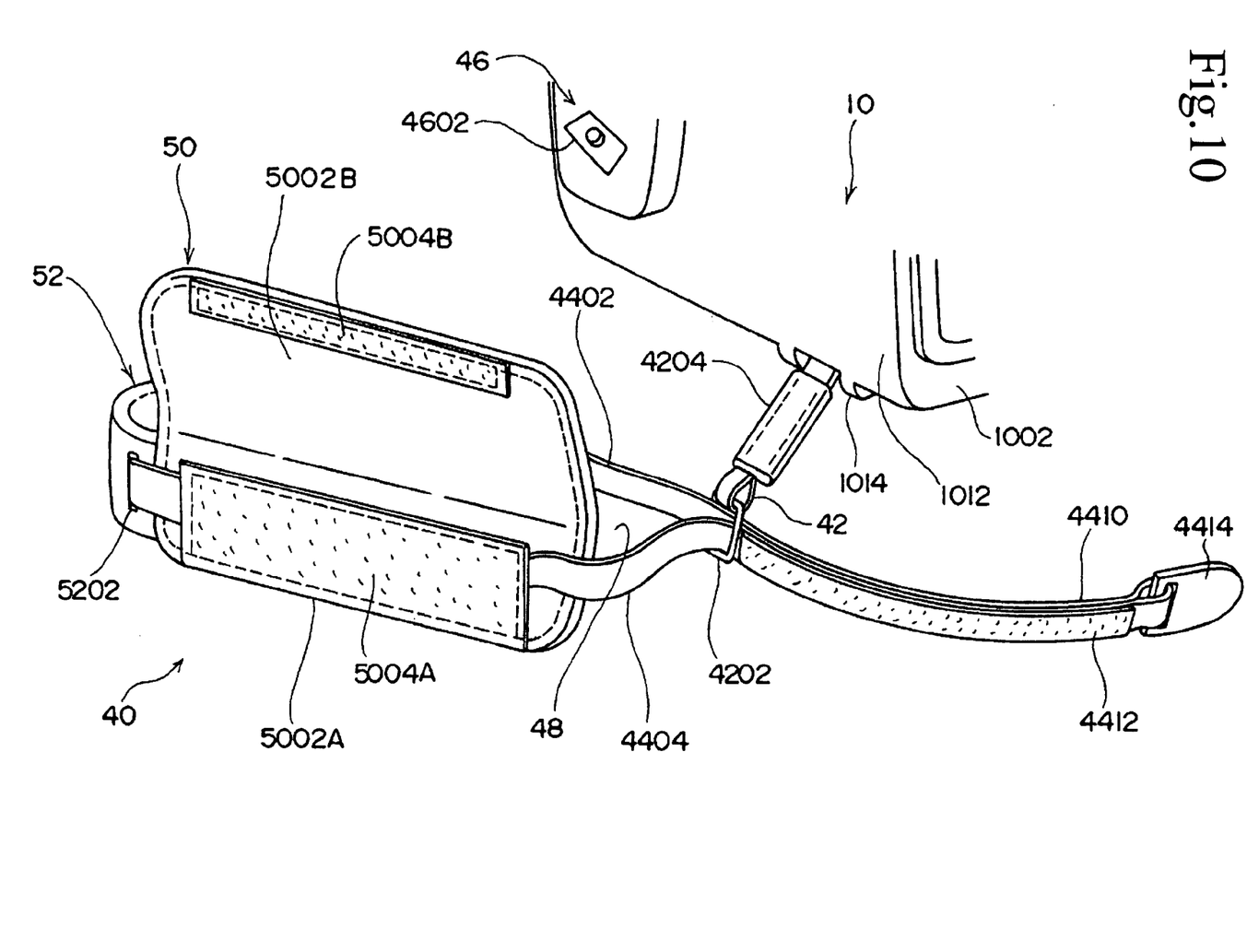
FIG. 10 is a still further perspective view showing a configuration for a grip belt.

Giving a detailed description of the second belt 44 as shown in FIG. 7 to FIG. 11, the second belt 44 is formed by folding a single belt object at a middle part in a longitudinal direction and then joining the ends. The inside belt section 4402 and the outside belt section 4404 are then formed of the belt object portion except a joining section 4410 where the belt object is joined. The back hand pad 50 is constituted by a pair of opening and closing flaps 5002A and 5002B capable of being opened and closed and surface fasteners 5004A and 5004B attached at opposing surfaces of the opening and closing flaps 5002A and 5002B. The outside belt section 4404 is then inserted through at the inside portion of the surface fastener 5004A on one opening and closing flap 5002A of the pair of opening and closing flaps 5002A and 5002B and is sewn on the opening and closing flap 5002A together with the surface fasteners. The pad 52 projects from the opening and closing flap 5002A. In this embodiment, a belt insertion through-hole 5202 extending along the longitudinal direction of the pad 52 is provided within the pad 52, and the inside belt section 4402 is inserted through this belt insertion through-hole 5202. As shown in FIG. 10, the joining section 4410 and portions of the inside belt section 4402 and the outside belt section 4404 in the vicinity of the joining section 4410 are inserted at the belt connecting link 4202 and folded back from the inside belt section 4402 as shown in FIG. 9. The end of the joining section 4410 is then arranged between the pair of opening and closing flaps 5002A and 5002B so that the surface fastener 4412 of the end of the joining section 4410 is attached to the surface fastener 5004A of the opening and closing flap 5002A. Then, as shown in FIG. 7, support by the opening and closing flaps 5002A and 5002B is achieved by closing the pair of opening and closing flaps 5002A and 5002B via the surface fasteners 5004A and 5004B. It is possible to adjust the size of the hand insertion section 48 by changing the length of the joining section 4410, supported by the pair of opening and closing flaps 5002A and 5002B. An engaging clasp 4414 is then attached to the end of the joining section 4410 so that the joining section 4410 does not come away from the belt connecting link 4202.

Figure 12:
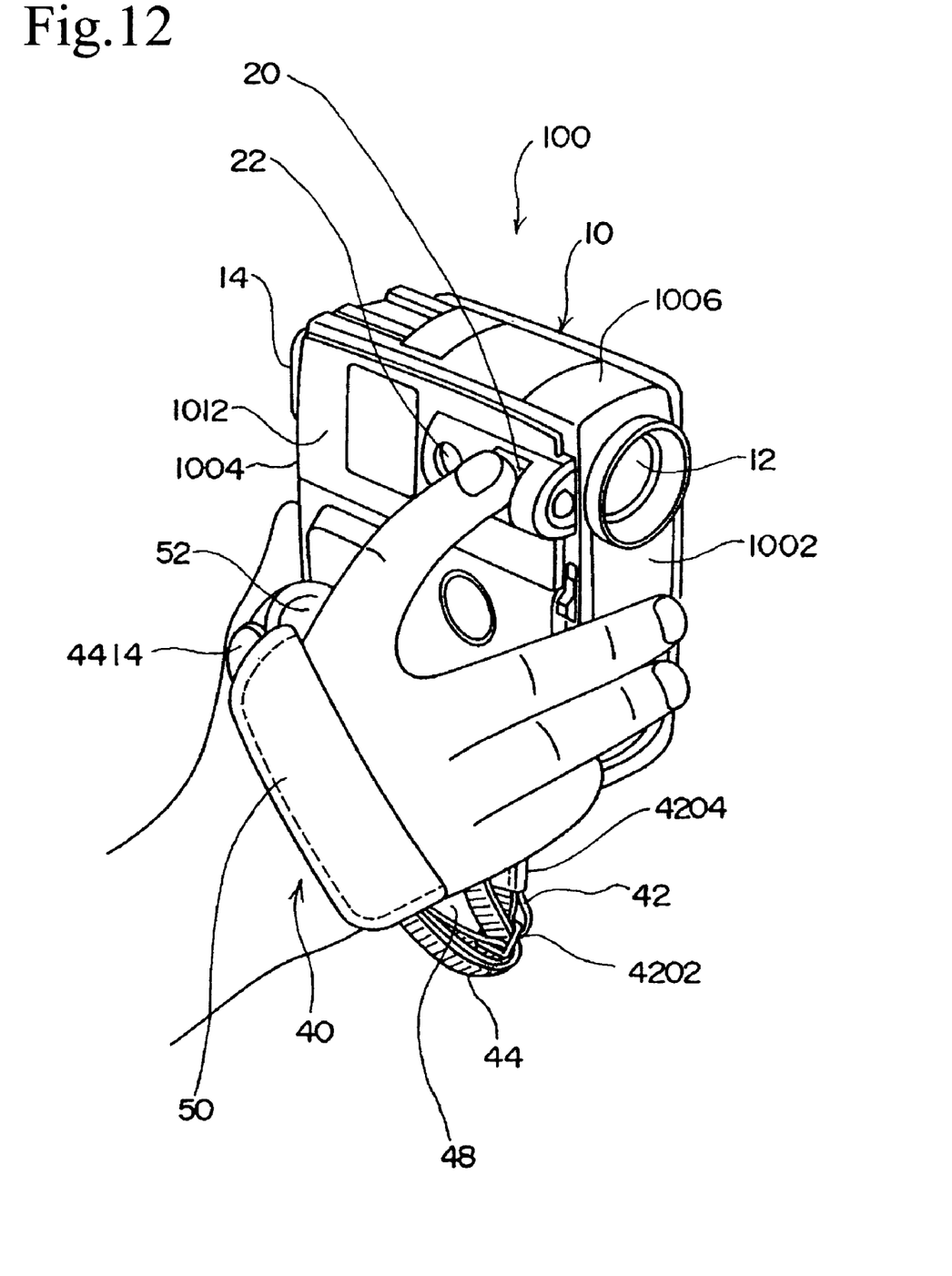
FIG. 12 is a view illustrating use of a grip belt.

Next, a description is given of the results of the operation. In this embodiment, as shown in FIG. 12, the camera body 10 is held by passing the four fingers of the right hand with the exception of the thumb and the palm part corresponding to the four fingers through the hand insertion section 48 so that the end of the thumb comes into contact with the rear surface 1004 of the camera body 10 and the tip of the middle finger and tip of the third finger come into contact with the front surface 1002 of the camera body 10. It is then possible to operate photographing operation members such as the zoom lever 20 and the shutter button 22, etc. using the index finger. Alternatively, the camera body 10 is held by passing the four fingers of the right hand with the exception of the thumb and the palm part corresponding to the four fingers through the hand insertion section 48 so that the end of the thumb comes into contact with the rear surface 1004 of the camera body 10 and the tips of the middle finger, third finger and little finger come into contact with the front surface 1002 of the camera body 10. It is then possible to operate photographing operation members using the index finger.

In this case, in a difference from the related art, rather than a hand being inserted between the side surface of the camera body 10 and the grip belt, a hand is passed through the hand insertion section 48 capable of freely moving with respect to the right side surface 1012 of the camera body. And, also, the front end of the insertion section 48 is connected to the lower end of the first belt 42 at a distance below the lower part of the front end of the camera body 10, so that a greater range of freedom of movement with respect to the right side surface 1012 of the camera body 10 is ensured. The hand inserted into the hand insertion section 48 therefore is not restrained by the right side surface 1012 of the camera body 10 and the grip belt 40, a large degree of freedom for the palm of the hand can be ensured, and it is easy for the fingers to reach appropriate locations because the camera body 10 is held in the fingertips. This is advantageous for the camera body 10 to be securely gripped. The fingers easily reach locations where it is easy to operate photographing operation members such as the zoom lever 20 and the shutter button 22, etc.; and there also is the advantage of operating the photographing operation member provided at the upper part of the front part of the right side surface 1012 of the camera body 10. Further, in a difference with the related art, rather than inserting the hand between the side surface of the camera body 10 and the grip belt 40, the hand is inserted into the hand insertion section 48, ensuring a substantial degree of freedom of movement with respect to the right side surface 1012 of the camera body 10. It is therefore possible to ensure a substantial degree of freedom for the hand without the hand being restricted by the right side surface 1012 of the camera body 10 as in the related art so that handling and manageability can be improved.

Figure 11:
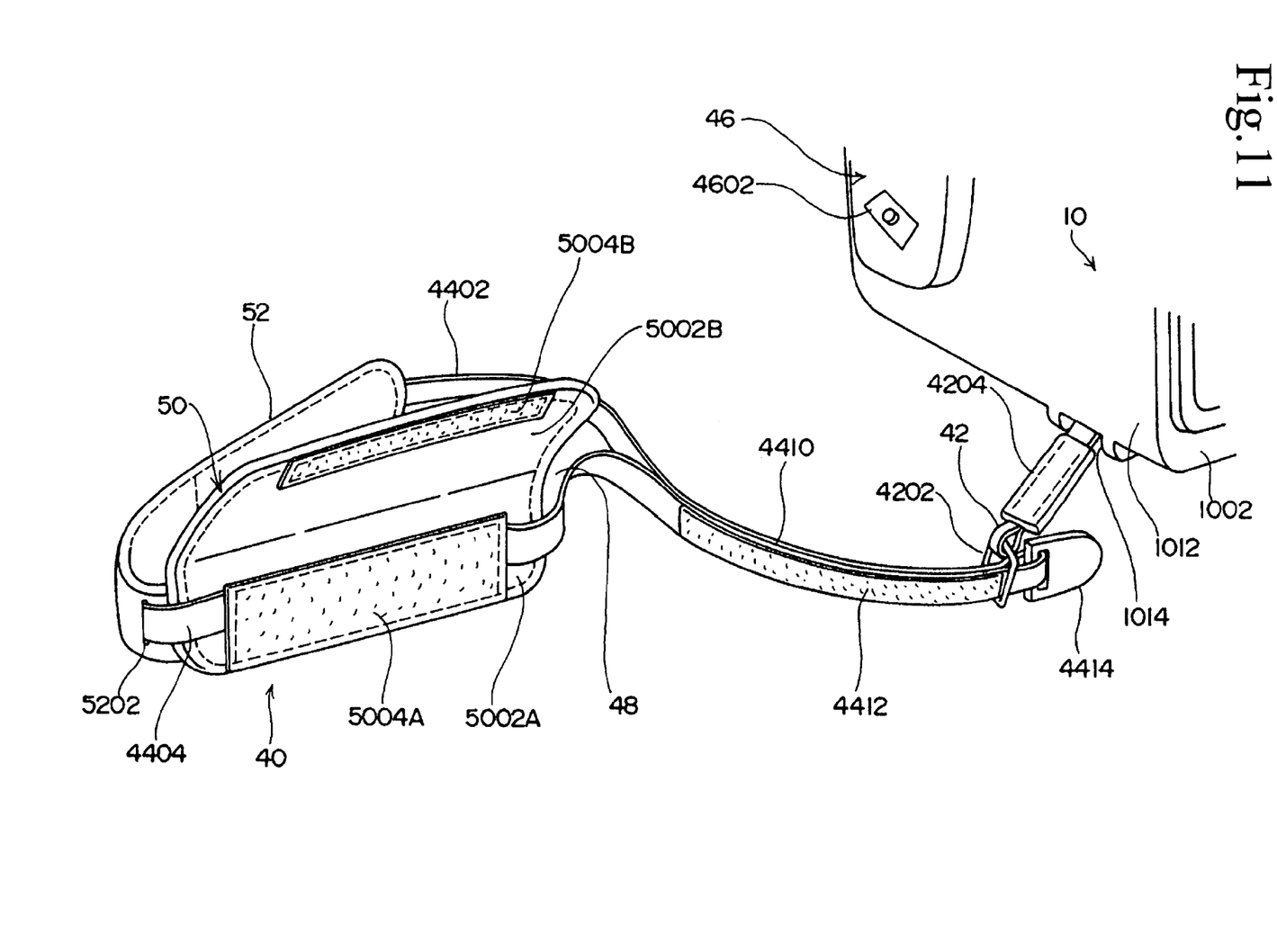
FIG. 11 is a still further perspective view showing a configuration for a grip belt.

In this embodiment, the rear end of the inside belt section 4402 is attached in a detachable manner to the right side surface 1012 of the camera body 10. It is therefore possible to use the grip belt 40 as a strap belt by removing the rear end portion of the inside belt section 4402 from the right side surface 1012 of the camera body 10. In other words, as shown in FIG. 7 and FIG. 8, the inside belt section 4402 can be pulled away from the right side surface 1012 of the camera body 10 by detaching the clasp 4406 of the inside belt section 4402 of the grip belt 40 from the engaging/disengaging mechanism 46 of the camera body 10. Next, as shown in FIG. 9, FIG. 10 and FIG. 11, the end of the joining section 4410 is extracted from between the pair of opening and closing flaps 5002A and 5002B, and the joining section 4410 is withdrawn until the engaging clasp 4414 engages with the belt connecting link 4202. The grip belt 40 can then be used as a strap belt by closing the pair of opening and closing clasps 5002A and 5002B via surface fasteners 5004A and 5004B. Specifically, when the joining section 4410 is pulled out until the engaging clasp 4414 engages with the belt connecting link 4202, as shown in FIG. 11, the lengths of the inside belt section 4402 and the outside belt section 4404 become a maximum, the size of the hand insertion section 48 also becomes a maximum, and the hand insertion section 48 becomes a size capable of enabling the whole of the palm of a hand to enter within. It is therefore possible to insert the right hand through the hand insertion section 48 and use the grip belt 40 as a strap belt. In this case, as shown in FIG. 13, the right hand is inserted through the hand insertion section 48, and the camera body 10 can be gripped using the right hand with the hand insertion section 48 positioned at the wrist. In the event of carrying out high-angle photographing where the camera body 10 is positioned above the head of the user or in the case of low-angle photographing where the camera body 10 is positioned below the head of the user, it is possible to freely change the posture of the camera body 10 and improve handling and manageability.

In this embodiment, a description is given for the case where the grip belt 40 is constructed from the first belt 42 and the second belt 44 separate from the first belt 42. However, it is also possible for the grip belt 40 to be configured from a single belt depending on the handling condition of the belt and/or the structure of the belt connecting link 4202. The present invention can then naturally be applied to a configuration where the grip belt 40 is a single belt. In this case, the belt portion corresponding to this embodiment will correspond to the first belt 42 and the second belt 44 respectively. Moreover, this embodiment shows an example where the camera is a video camera, but the present invention also may be applied naturally to various cameras such as digital cameras, television cameras or film-type cameras.

Finally, the embodiments and examples described above are only examples of the present invention. It should be noted that the present invention is not restricted only to such embodiments and examples, and various modifications, combinations and sub-combinations in accordance with its design or the like may be made without departing from the scope of the present invention.

What is claimed is:

1. A camera comprising:

a camera body formed in a flat rectangular shape of a length from front to back and a height from top to bottom greater than a thickness from left to right;

a photographing optical system provided so as to be exposed from the upper part of a front surface of said camera body;

a photographing operation member provided at the upper front part of the right side surface of said camera body; and a grip belt provided at the right side surface of said camera body; wherein said grip belt has a first belt attached to the lower part of the front part of said camera body so as to be hung down from said lower part with a belt connecting link being attached to the lower end thereof, and a second belt connected to said belt connecting link;

said second belt has a hand insertion section of a size that allows insertion of four fingers of the right hand with the exception of the thumb and the palm portion corresponding to the four fingers, said hand insertion section is provided by an inside belt section positioned at the right side surface of said camera body and an outside belt section positioned to the outside of said inside belt section;

one end of said inside belt section in the longitudinal direction is connected to said belt connecting link and the other end in the longitudinal direction is attached to the rear part of the right side surface of said camera body;

said hand insertion section becomes a long shape in a direction from the front to the rear of said camera body on the right side surface of said camera body due to said inside belt section, and it is tilted so that the rear end of said hand insertion section is positioned above the front end of said hand insertion section; and the four fingers of the right hand with the exception of the thumb and the palm portion corresponding to the four fingers are inserted through the hand insertion section so that the tip of the thumb comes into contact with the rear surface of said camera body and said camera body is held with at least the tips of the middle finger and third finger coming into contact with the front surface of said camera body, and said photographing operation member is able to be operated by the index finger.

2. The camera according to claim 1, wherein
the other end of said inside belt section is attached to a location above a portion where said first belt is attached to said camera body at the right side surface of said camera body.

3. The camera according to claim 1, wherein
the other end of said inside belt section is attached in a detachable manner to the right side surface of said camera body.

4. The camera according to claim 1, wherein
a back hand pad is attached to said outside belt section.

5. The camera according to claim 1, wherein
said back hand pad is attached to said outside belt section;
a pad is attached to said back hand pad;
said pad covers said inside belt section, makes contact with the palm portion of the hand when the four fingers of the right hand except for the thumb and the palm portion corresponding to the four fingers are inserted in said hand insertion section, and is made from a flexible material.

6. The camera according to claim 1, wherein
said second belt is formed by folding a single belt object at a middle part in a longitudinal direction and joining the ends;
said inside belt section and said outside belt section are formed by portions of said belt object other than a joining section where said belt object is joined;
a back hand pad is provided on said outside belt section;
said back hand pad has a pair of opening and closing flaps capable of being opened and closed and surface fasteners attached at opposing surfaces of said opening and closing flaps;
said outside belt section is inserted through one opening and closing flap of said pair of opening and closing flaps;
said joining section where said belt object is joined and portions of said inside belt section and said outside belt section in the vicinity of said joining section are inserted through said belt connecting link and folded back from said belt connecting link;
the end of said joining section of said belt object is arranged between said pair of opening and closing flaps and held by said opening and closing flaps by closing said pair of opening and closing flaps with said surface fasteners.

* * * * *